(12) United States Patent
Claussen et al.

(10) Patent No.: US 6,372,309 B1
(45) Date of Patent: Apr. 16, 2002

(54) LIQUID CRYSTAL DISPLAY

(75) Inventors: Uwe Claussen, Leverkusen; Serguei Kostromine, Swisttal; Ralf Neigl, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/367,613

(22) PCT Filed: Feb. 4, 1998

(86) PCT No.: PCT/EP98/00583

§ 371 Date: Aug. 17, 1999

§ 102(e) Date: Aug. 17, 1999

(87) PCT Pub. No.: WO98/36314

PCT Pub. Date: Aug. 20, 1998

(30) Foreign Application Priority Data

Feb. 17, 1997 (DE) .......................... 197 06 029

(51) Int. Cl.⁷ ...................... C09K 19/00; G02F 1/1335; G02B 5/30
(52) U.S. Cl. .................. 428/1.5; 428/1.1; 428/1.31; 349/117; 349/118; 349/119; 349/120; 349/121; 359/500
(58) Field of Search ............... 349/117, 118, 349/119, 120, 121; 359/500; 428/1.1, 1.31, 1.5

(56) References Cited

U.S. PATENT DOCUMENTS

| | | | | |
|---|---|---|---|---|
| 5,389,698 A | | 2/1995 | Chigrinov et al. ............ 522/2 |
| 5,396,355 A | * | 3/1995 | Wada et al. | |
| 5,456,867 A | * | 10/1995 | Mazaki et al. | |
| 5,472,635 A | | 12/1995 | Iida et al. ............... 252/299.01 |
| 5,491,001 A | * | 2/1996 | Mazaki et al. | |
| 5,526,150 A | * | 6/1996 | Mazaki et al. | |
| 5,543,267 A | | 8/1996 | Stumpe et al. ............... 430/290 |
| 5,583,677 A | | 12/1996 | Ito et al. ..................... 349/118 |
| 5,599,478 A | * | 2/1997 | Matumoto et al. | |
| 5,731,405 A | * | 3/1998 | Gibbons et al. | |
| 5,737,046 A | * | 4/1998 | Moriwaki et al. | |
| 5,784,139 A | | 7/1998 | Chigrinov et al. .......... 349/117 |
| 5,831,703 A | * | 11/1998 | Nishiguchi et al. | |
| 6,061,113 A | * | 6/2000 | Kawata | |

FOREIGN PATENT DOCUMENTS

EP 0 646 829 4/1995

OTHER PUBLICATIONS

J. Stumpe et al, Thin Solid Films, vol. 284/285, Sep. 15, 1996, pp. 252–256.

* cited by examiner

Primary Examiner—Blaine Copenheaver
Assistant Examiner—Hai Vo
(74) Attorney, Agent, or Firm—Joseph C. Gil; Aron Preis; James R. Franks

(57) ABSTRACT

Liquid crystal displays in which the phase compensation layer comprises an amorphous optically anisotropic polymer, the optical anisotropy being written in, by irradiation with polarized light, in the pre-selected manner according to size and direction.

16 Claims, 1 Drawing Sheet

LIQUID CRYSTAL DISPLAY

Liquid crystal displays, especially in the form of TN (twisted nematic) or STN (super twisted nematic) displays are widely used. Because of the threshold voltage required for switching a display element, these liquid crystal systems are suitable for multiplex control. Larger displays, in particular for laptop screens, which have more than $10^5$ display elements (pixels), can be produced with the aid of thin film field transistor technology (TFT). For display technology, see Ullmann's Encyclopaedia of Industrial Chemistry, vol. A 15, 1990, page 272 to 277 and page 359 to 391, and vol. A 8, page 619 to 621.

Liquid crystal display is based on a change in the direction of the optical axis in a layer of a birefringent organic liquid of almost crystalline arrangement effected by application of an electrical field. On passing through the liquid crystal layer, polarised light undergoes a rotation of the plane of polarization. If the polarized light which has passed through the liquid crystal layer is viewed through a second polarization film, light/dark contrasts result, depending on the rotation of the plane of polarization of the light.

A black/white or grey scale contrast which is as far as possible non-coloured is aimed for here. Because of the phase difference between the ordinary and extraordinary light ray, however, certain wavelengths of the white light spectrum are extinguished. This is counteracted by the phase difference being compensated for by means of $\lambda/4$ to $\lambda/2$ platelets. However, compensation of the phase difference is achieved only in the region of small angles of observation. It has therefore also already been proposed to achieve the phase compensation by additional liquid crystal layers which are not stimulated by electrical fields. U.S. Pat. No. 5,472,635 thus proposes employing a nematic liquid crystal below the glass transition temperature, the nematic phase being frozen-in. EP-A 646 829, on the other hand, proposes employing a layer of a low molecular weight discotic liquid crystal as the phase compensation layer.

Disadvantages of these proposals are that on the one hand high requirements regarding the thickness of the liquid crystal layer are to be imposed, and furthermore additional transparent carrier plates, between which the liquid crystal layer is accommodated, are required.

Figure 1:
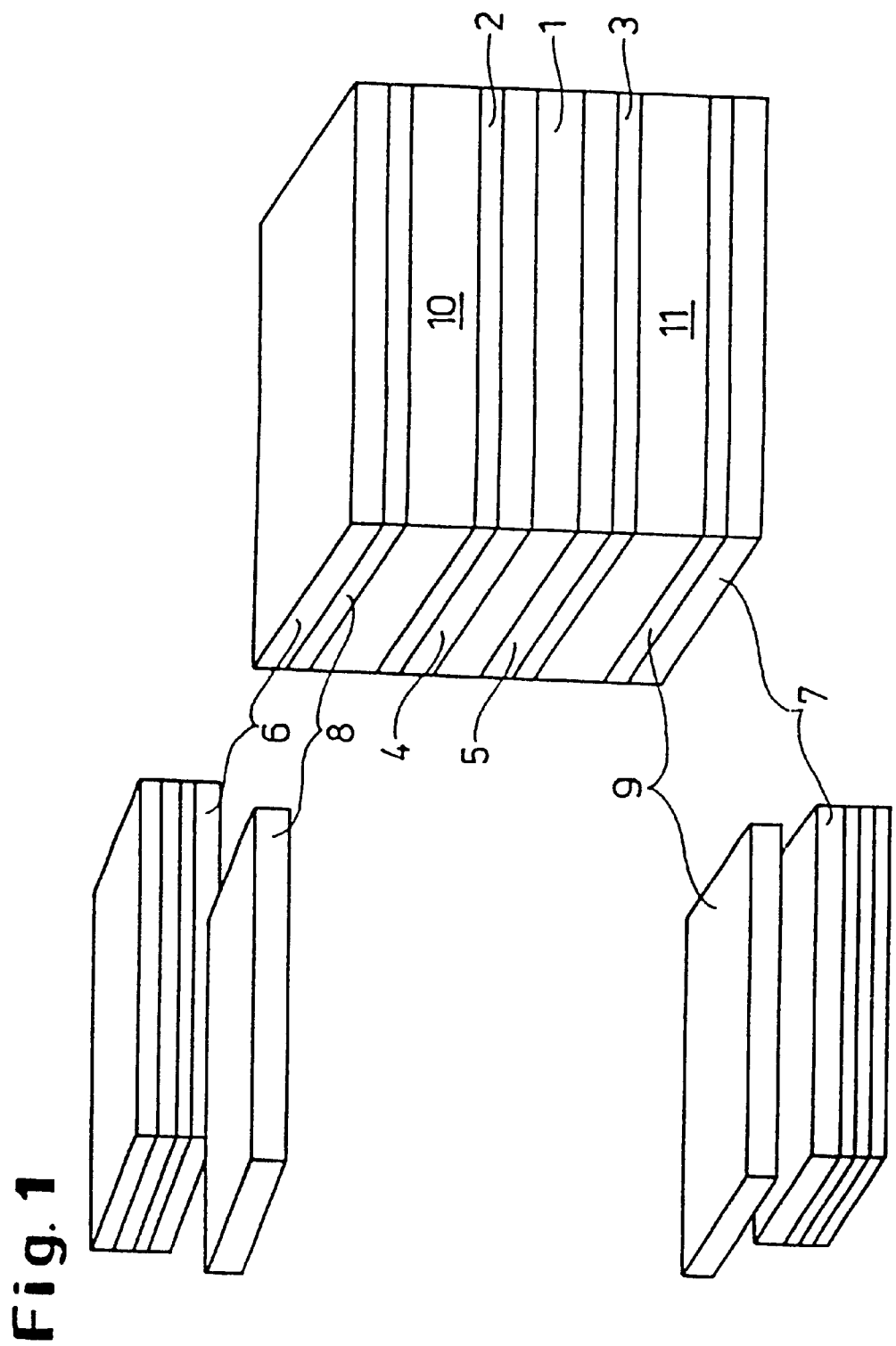
FIG. 1 is a schematic representation of an STN display.

According to the invention, it is now proposed to provide a film of an amorphous optically anisotropic polymer, the optical anisotropy of which can be written-in in a pre-selectable manner according to direction and size by irradiation with polarized light, as the phase compensation layer.

The present invention accordingly provides a liquid crystal display which has a liquid crystal cell which comprises a layer of a liquid crystal material with positively dielectric anisotropy between two electrode plates, polarizer plates arranged outside the electrode plates and a phase compensation layer arranged between at least one of the electrode plates and the polarizer plate facing this, which is characterized in that the phase compensation layer comprises an amorphous, optically anisotropic polymer, the optical anisotropy of which can be written-in in a pre-selectable manner according to direction and size by irradiation with polarized light.

Polymers which are suitable for the phase compensation layer according to the invention are known per se as photo-addressable polymers; see e.g. "Polymers as Electro-optical and Photo-optical Active Media", V. B. Shivaev (ed), Springer Verlag, N.Y. 1995. Side group polymers, of which the group of copolymers is distinguished by a very wide range of possible variations of the properties, are particularly suitable. These substances are characterized by the ability to form a permanent aligned birefringence on irradiation with polarzied light of adequate intensity.

Suitable polymers are also known, for example, from DE-A 38 10 722, DE-A 39 20 420, EP-A 622 789, EP-A 704 513 and WO 96/08007.

Polymers which can be preferably be employed according to the invention are disclosed in U.S. Pat. Nos. 5,543,267 and 5,641,846 incorporated by reference herein.

Polymers which are also preferred according to the invention are homo- and copolymers with a main chain acting as a backbone and covalently bonded side groups, branching off therefrom of the formulae

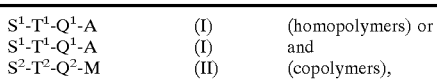

| | | |
|---|---|---|
| $S^1\text{-}T^1\text{-}Q^1\text{-}A$ | (I) | (homopolymers) or |
| $S^1\text{-}T^1\text{-}Q^1\text{-}A$ | (I) | and |
| $S^2\text{-}T^2\text{-}Q^2\text{-}M$ | (II) | (copolymers), | wherein
$S^1$, $S^2$ denote the atoms O, S or the radical $NR^6$,
$R^6$ denotes hydrogen or $C_1\text{-}C_4$-Alkyl,
$T^1$, $T^2$ denote the radical $(CH_2)_n$, which can optionally be interrupted by —O—, —$NR^6$— or —$OSiR^6{}_2O$— and/or optionally substituted by methyl or ethyl,
n denotes the numbers 2, 3 or 4,
$Q^1$, $Q^2$ denote a divalent radical,
A denotes a unit which can absorb electromagnetic radiation and
M denotes a polarizable aromatic group having at least 10 $\pi$-electrons.
In particular
$Q^1$, $Q^2$ denote the substituents —S—, —$SO_2$—, —O—, —COO—, —$CONR^6$—, —$NR^6CO$—, —$NR^1$—, —$(CH_2)_m$—, where m=1 or 2, or the group —$Z^1$—X—$Z^2$—, wherein
$Z^1$, $Z^2$ represent the substituents —S—, —$SO_2$—, —O—, —COO—, —OCO—, —$CONR^6$—, —$NR^6CO$—, —$NR^1$—, —N=N—, —CH=CH—, —N=CH, —CH=N— and
X represents a 5- or 6-membered cycloaliphatic, aromatic or heterocyclic ring, the radical —$C_{10}H_6$—, the biphenyl radical, the group —$(CH=CH)_m$— and, in the case where Z=—COO— or —$CONR^6$—, also represents a direct bond,
A denotes an azo dyestuff which absorbs in the wavelength range between 13,000 and 28,000 $cm^{-1}$, or a stilbene dyestuff which absorbs in the wavelength range between 15,000 and 29,000 $cm^{-1}$ and
M denotes a mesogen or a polarizable aromatic group having at least 10 $\pi$-electrons, with the proviso that $$V_{max}(Q^2\text{-}M) > V_{max}(Q^1\text{-}A)$$

Dyestuffs A with an absorption maximum at wave numbers of ($V_{max}$), >23,000 $cm^{-1}$ are preferred. The compounds are known.

(Meth)acrylates are preferably employed as the main chain which forms the backbone.

In the vitreous state of the polymers, the side group polymers according to the invention are optically isotropic, amorphous and transparent and do not scatter light, and they can be cast into clear transparent films from suitable solvents.

Multi-layered films can also be produced by appropriate measures. If the layers are produced from side chain polymers which contain groups which absorb at different wavelengths, different values of the birefringence can be written into the same film independently of one another by suitable choice of the writing wavelength.

The birefringences are written into the isotropic layer by means of polarized light, for the refractive index n of which in the spatial directions x, y and z $n_x=n_y=n_z$. The incident light from the z direction polarized in the s direction spans an area in which: $n_z \neq n_y$ and $n_x - \Delta n_x = n_y + \Delta n_y$. This area is preferably at an angle to the surface of the film, which forms the z direction with its perpendicular to the surface, of 25 to 65°, in particular 40 to 50°. The change in birefringence written in can be uni- or biaxial, this depending on the choice of components and to a certain extent also on the choice of writing-in wavelength. The lower the absorption, the more the result approaches uniaxial distribution.

A particular advantage of the invention is that the birefringence can be adjusted as required with local resolution, for example with a gradient from the middle of the display to the edge, or to produce permanent patterns, images, symbols or shadings on the display.

The polymers can form self-supporting films.

Preferably, however, they are applied to carrier materials. This can be effected by various techniques known per se, the process being chosen according to whether a thick or thin layer is desired. Thin layers can be produced e.g. by spin coating or knife-coating from solutions or melts, and thicker layers can be produced by filling prefabricated cells, melt pressing or extrusion.

Preferably, according to the invention, the phase compensation layer is produced directly on the polarizer film or applied to this, so that a particular carrier material is not necessary for the polymer layer. As a result, the production process of displays according to the invention is simplified considerably. The birefringence is written in from the side of the phase compensation layer which is not covered by the polarization film.

The accompanying FIGURE shows the construction in principle of an STN display. This comprises a liquid crystal layer 1 between the glass carrier layers 10 and 11. The transparent electrode structures of indium-tin oxide (ITO) 2 and 3 and, if appropriate, the TFT layer are applied to the glass carrier layers 10 and 11. Over the electrode layer is the orientation layer 4 or 5, in general a brushed polyimide layer, which is stoved. The brushing directions of the two orientation layers are rotated with respect to one another by 90 to 270°. Polarization layers 6 and 7 with a plane of polarization rotated by 60 to 120° are now applied on both sides to the liquid crystal cell defined by the glass carrier layers. Between carrier layers 10 and 11 and polarization layers 6 and 7 are the phase compensation layers 8 and 9, the polarization direction of which is again rotated through an angle of 60 to 120° with respect to the particular opposite polarization layer. The polarization films in general have a multi-layered structure, to which the phase compensation layer is preferably added according to the invention as a further layer. In the case of a display operated by reflection, the glass carrier layer on the reverse is mirrored.

The following examples illustrate the birefringence which can be imprinted in the phase compensation film and depends on the irradiation density and the polarization of the radiation.

EXAMPLE 1

Starting from 2,4-dicyano-4'-[(4-oxyethylenemethacryloyl)benzamido]-azobenzene, the homopolymer is prepared by free radical polymerization and the purified polymer is applied by spin coating to a glass carrier in a layer thickness of 0.8 $\mu$. The maximum absorption is at 25,300 $cm^{-1}$.

The samples are irradiated with laser light of wavelength 488 nm (20,500 $cm^{-1}$) incident in the z-direction for 20 h and the refractive indices are then measured as a function of the direction in a prism coupler. The following values are obtained:

| Irradiation density | $n_x$ | $n_y$ | $n_z$ |
| --- | --- | --- | --- |
| 0 | 1.701 | 1.703 | 1.644 |
| 4 mW/cm$^2$ | 1.735 | 1.617 | 1.705 |
| 20 mW/cm$^2$ | 1.718 | 1.627 | 1.718 |

A uniaxial orientation is obtained.

EXAMPLE 2

The procedure is as in example 1, but instead of the homopolymer, a copolymer of 40 mole % of the monomer mentioned in example 1 and 60 mole % of 2,4-dicyano-4-(N-methyl-N'-ethylenoxymethacryloyl)-azobenzene is used.

The samples are irradiated with laser light of wavelength 488 nm (20,500 $cm^{-1}$) and output density 20 mW/cm$^2$ incident in the z-direction and the refractive indices are then measured as a function of the direction in a prism coupler. The following values are obtained:

| after | $n_x$ | $n_y$ | $n_z$ |
| --- | --- | --- | --- |
| 0 h | 1.832 | 1.832 | 1.738 |
| 2 h | 1.860 | 1.787 | 1.759 |
| 4 h | 1.891 | 1.734 | 1.780 |
| 20 h | 1.921 | 1.601 | 1.792 |

It can be seen that an intense biaxial anisotropy has developed.

What is claimed is:

1. A liquid crystal display which has a liquid crystal cell which comprises
    a layer of a material with positively dielectric anisotropy between two electrode plates,
    polarizer plates arranged outside the electrode plates, and
    a phase compensation layer interposed between at least one of the electrode plates and the polarizer plate,
        wherein the phase compensation layer comprises an optically addressable, amorphous, transparent optically anisotropic polymer in which an optical anisotropy is selectively induced by irradiating the phase compensation layer with polarized light, having a selected wavelength, along a selected direction of incidence relative to the phase compensation layer.

2. The liquid crystal display of claim 1 wherein the incident polarized light spans an area which is at an angle to the perpendicular axis of the surface of the phase compensation layer.

3. The liquid crystal display of claim 2 wherein the angle is 25 to 65°.

4. The liquid crystal display of claim 1 wherein the phase compensation layer has a uniaxial anisotropy.

5. The liquid crystal display of claim 1 wherein the phase compensation layer has biaxial anisotropy.

6. The liquid crystal display of claim 1 wherein the optical anisotropy of said phase compensation layer is adjusted by means of local resolution.

7. The liquid crystal display of claim 1 wherein said liquid crystal cell has a middle, an edge and a gradient optical anisotropy from the middle to the edge of the cell.

8. The liquid crystal display of claim 1 wherein the optical anisotropy of said phase compensation layer is in a permanent form selected from at least one of patterns, images and symbols.

9. A liquid crystal display containing a liquid crystal cell and at least two phase compensation layers, each of said phase compensation layers comprising an optically addressable, amorphous and transparent polymer, said polymer characterized in that optical anisotropy is induced therein by irradiation with polarized light.

10. The liquid crystal display of claim 9 wherein optical anisotropy is uniaxial.

11. The liquid crystal display of claim 9 wherein polymer is a homopolymer with a main chain acting as a backbone and covalently bonded side groups, branching off therefrom, of the formula $S^1$—$T^1$—$Q^1$—A, wherein $S^1$ denotes the atoms O, S or the radical $NR^6$, where $R^6$ is hydrogen or a $C_{1-4}$-alkyl; $T^1$ denotes the radical $(CH_2)_n$, where n is 2, 3 or 4; $Q^1$ denotes a divalent radical and A is a unit capable of absorbing electromagnetic radiation.

12. The liquid crystal display of claim 11 wherein A denotes a member selected from the group consisting of azo dyestuff which absorbs in the wavelength range of 13,000 to 28,000 $cm^{-1}$ and stilbene dyestuff which absorbs in the wavelength range of 15,000 to 29,000 $cm^{-1}$.

13. The liquid crystal display of claim 9 wherein polymer is a copolymer with a main chain acting as a backbone and covalently bonded side groups, branching off therefrom, of the formulae $S^1$—$T^1$—$Q^1$—A and $S^2$—$T^2$—$Q^2$—M wherein $S^1$ and $S^2$ denote the atoms O, S or the radical $NR^6$, where $R^6$ is hydrogen or a $C_{1-4}$-alkyl; $T^1$ and $T^2$ denote the radical $(CH_2)_n$, where n is 2, 3 or 4; $Q^1$ and $Q^2$ denote divalent radicals, A is a unit capable of absorbing electromagnetic radiation and M denotes a polarizable aromatic group having at least 10 π-electrons.

14. The liquid crystal display of claim 13 wherein A denotes a member selected from the group consisting of azo dyestuff which absorbs in the wavelength range of 13,000 to 28,000 $cm^{-1}$ and stilbene dyestuff which absorbs in the wavelength range of 15,000 to 29,000 $cm^{-1}$, and M denotes a mesogen.

15. The liquid crystal display of claim 13 wherein $V_{max}(Q^2-M) < V_{max}(Q^1-A)$.

16. The liquid crystal display of claim 9 wherein at least one of the phase compensation layers has biaxial anisotropy.

* * * * *